B. F. CRANWELL & W. J. ROBERTSON.
SEDIMENT TRAP.
APPLICATION FILED APR. 22, 1914.
1,115,784.
Patented Nov. 3, 1914.
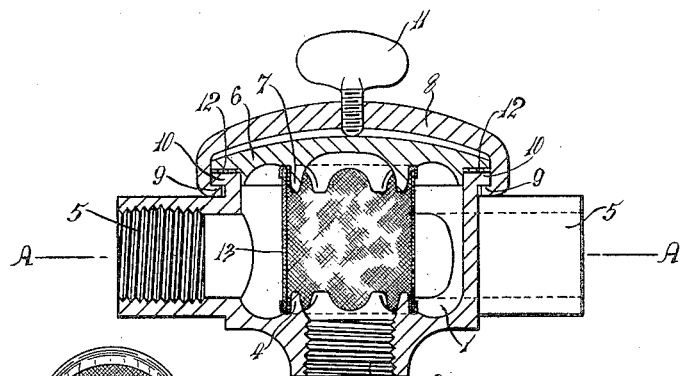
FIG. 1.
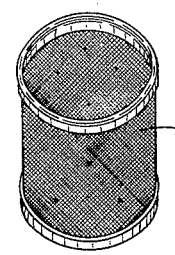
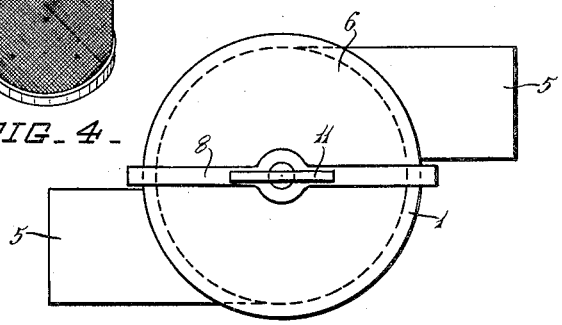
FIG. 4.
FIG. 2.
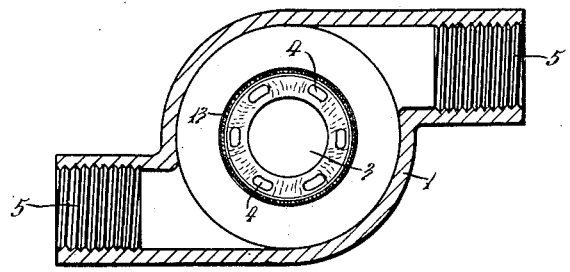
FIG. 3.
Witnesses:—
May G. Luttrell
John H. Heins
B. F. Cranwell.
W. J. Robertson.
Inventors.
By G. Croyden Marks
Attorney.

UNITED STATES PATENT OFFICE.

BENJAMIN F. CRANWELL AND WILLIAM J. ROBERTSON, OF AUCKLAND, NEW ZEALAND.

SEDIMENT-TRAP.

1,115,784.     Specification of Letters Patent.     Patented Nov. 3, 1914.

Application filed April 22, 1914. Serial No. 833,659.

*To all whom it may concern:*

Be it known that we, BENJAMIN FRANKLIN CRANWELL and WILLIAM JAMES ROBERTSON, citizens of the Dominion of New Zealand, and residing at 16 Custom street, Auckland, in the Provincial District of Auckland, in the Dominion of New Zealand, have invented certain new and useful Improvements in Sediment-Traps, of which the following is a specification.

This invention relates to traps used for straining foreign matter from liquids and thereby preventing it from clogging the valves of pumps or from obstructing nozzles, waste pipes, drain pipes and the like.

Our invention comprises a vessel, located between the source of supply and the delivery, and made sufficiently strong to withstand the vacuum or pressure required for delivering the liquid. The vessel has one or more inlet openings, and an outlet. In the interior of the vessel and around the outlet opening, a serrated flange is provided with a conical exterior periphery.

A cap fitting the open end of the vessel is held in position by a clamping bar, the ends of which take beneath a flange provided around the open end of the vessel. A tight joint is made by a screw forcing the cap down upon a rubber washer. The cap has a serrated flange corresponding to the flange at the bottom of the vessel, and a cylinder of wire gauze or perforated material fits upon the flanges and by them is held in position.

The drawing herewith illustrates the invention.

Figure 1, is a sectional elevation. Fig. 2, a plan. Fig. 3, a sectional plan on line A—A, Fig. 1, and Fig. 4, a perspective view of the collar.

The vessel 1 has an outlet 3, around which is a serrated flange 4. The outer periphery of the flange is conical.

One or more nipples or openings 5 are provided upon the vessel. A cap 6 has a serrated flange 7 corresponding to the flange 4 and is held in position by a clamping bar 8, the ends 9 of which take beneath the flange 10 formed on the vessel. The cap 6 is held in position by a screw 11 which forces the cap 6 down upon a rubber washer 12.

A cylinder 13 of wire gauze or perforated material preferably non-corrodible, surrounds and is held in position by the flanges 4 and 7.

The water enters a nipple 5 and passes through the cylinder 13 and through the outlet 3. Sediment and foreign matter contained in the water is held back by the gauze material, and is readily removed from the vessel 2 by taking off the cap 6.

What we do claim and desire to secure by Letters Patent of the United States is:—

1. A sediment trap of the kind described, comprising a vessel having an inlet at one side thereof, an outlet arranged substantially at right angles to said inlet, a flange surrounding the outlet, an opening in the vessel opposite said outlet, a cap adapted to close said opening and having a flange facing the aforesaid flange, means for securing the cap upon the vessel, and a cylinder of perforated material the ends of which engage over the outside peripheries of the flanges.

2. A sediment trap of the kind described, comprising a vessel having a bottom provided with an outlet, a serrated and conical flange surrounding the outlet, a cap fitting the top of the vessel and having a serrated and conical flange, a clamping bar securing the cap to the vessel, and a cylinder of perforated material surrounding and held in position by the flanges, substantially as set forth.

3. A sediment trap of the kind described, comprising a circular vessel having an inlet at one side thereof, an outlet at the bottom, a serrated and conical flange surrounding said outlet, an opening at the top of the vessel, a projecting flange formed on said vessel around said opening, a cap adapted to close said opening and having a serrated and conical flange facing the flange which surrounds the outlet, a clamping bar adapted to engage under the flange which projects from the top of the vessel and to secure the cap to the vessel, and a cylinder of wire gauze the ends of which engage over the serrated flanges, substantially as described.

In testimony whereof we have signed our names to this specification in the presence of two witnesses.

B. F. CRANWELL.
                          W. J. ROBERTSON.

Witnesses:
     WM. OLIPHANT,
     A. L. FERNEYHOUGH.